US012651940B2

(12) United States Patent
Jeong et al.

(10) Patent No.: US 12,651,940 B2
(45) Date of Patent: Jun. 9, 2026

(54) ELECTRONIC COMPONENT MODULE AND MOTOR

(71) Applicant: LG INNOTEK CO., LTD., Seoul (KR)

(72) Inventors: Jae In Jeong, Seoul (KR); Kun Yong Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 192 days.

(21) Appl. No.: 18/570,826

(22) PCT Filed: Jun. 24, 2022

(86) PCT No.: PCT/KR2022/009015
§ 371 (c)(1),
(2) Date: Dec. 15, 2023

(87) PCT Pub. No.: WO2023/277458
PCT Pub. Date: Jan. 5, 2023

(65) Prior Publication Data
US 2024/0223037 A1     Jul. 4, 2024

(30) Foreign Application Priority Data

| Jul. 2, 2021 | (KR) | ........................ 10-2021-0087299 |
| Jul. 26, 2021 | (KR) | ........................ 10-2021-0098034 |

(51) Int. Cl.
*H02K 3/50*     (2006.01)
*H02K 3/28*     (2006.01)
(Continued)

(52) U.S. Cl.
CPC .............. *H02K 5/225* (2013.01); *H02K 3/28* (2013.01); *H02K 3/50* (2013.01); *H02K 3/52* (2013.01); *H02K 3/522* (2013.01)

(58) Field of Classification Search
CPC .......... H02K 5/225; H02K 3/28; H02K 11/00; H02K 3/50; H02K 5/22; H02K 1/2706;
(Continued)

(56) References Cited

U.S. PATENT DOCUMENTS

| 2004/0251752 A1* | 12/2004 | Shinzaki | ................ H02K 3/522 310/71 |
| 2012/0293024 A1* | 11/2012 | Yokogawa | ............. H02K 3/522 310/43 |

(Continued)

FOREIGN PATENT DOCUMENTS

| JP | 2013-102596 | 5/2013 |
| JP | 2017-208871 | 11/2017 |

(Continued)

OTHER PUBLICATIONS

International Search Report dated Oct. 17, 2022 issued in Application No. PCT/KR2022/009015.

*Primary Examiner* — Alexander A Singh
(74) *Attorney, Agent, or Firm* — KED & ASSOCIATES

(57) ABSTRACT

A motor comprises: a base; a first bus bar coupled to the base and comprising a first body and a first coupling portion extending from the first body; a second bus bar disposed outside the first bus bar and comprising a second body and a second coupling portion extending from the second body; and a third bus bar disposed outside the second bus bar and comprising a third body and a third coupling portion extending from the third body, wherein the first coupling portion does not overlap the second body and the third body in the axial direction, and the second coupling portion does not overlap the third body in the axial direction.

14 Claims, 13 Drawing Sheets

(51) Int. Cl.
 *H02K 3/52* (2006.01)
 *H02K 5/22* (2006.01)
(58) Field of Classification Search
 CPC .......... H02K 1/12; H02K 11/33; H02K 3/522;
 H02K 3/52; H02K 3/38
 USPC .......................................................... 310/71
 See application file for complete search history.

(56) References Cited

U.S. PATENT DOCUMENTS

| | | | |
|---|---|---|---|
| 2015/0162796 A1* | 6/2015 | Okamoto ................. | H02K 3/28 |
| | | | 310/71 |
| 2017/0133902 A1 | 5/2017 | Jang et al. | |
| 2019/0089108 A1* | 3/2019 | Lee ........................ | H02K 3/522 |
| 2019/0157934 A1* | 5/2019 | Kawaguchi .............. | H02K 3/50 |
| 2020/0343781 A1* | 10/2020 | An .......................... | H01R 25/16 |
| 2022/0271597 A1* | 8/2022 | Kamizato ................ | H02K 3/50 |

FOREIGN PATENT DOCUMENTS

| | | |
|---|---|---|
| KR | 10-2017-0128718 | 11/2017 |
| KR | 10-1917727 | 11/2018 |

* cited by examiner

1250

ELECTRONIC COMPONENT MODULE AND MOTOR

CROSS-REFERENCE TO RELATED PATENT APPLICATIONS

This application is a U.S. National Stage Application under 35 U.S.C. § 371 of PCT Application No. PCT/KR2022/009015, filed Jun. 24, 2022, which claims priority to Korean Patent Application Nos. 10-2021-0087299, filed Jul. 2, 2021 and 10-2021-0098034, filed Jul. 26, 2021, whose entire disclosures are hereby incorporated by reference.

TECHNICAL FIELD

The present embodiment relates to an electronic component module and a motor.

BACKGROUND ART

The motor includes a housing, a stator being disposed inside the housing, and a rotor being disposed inside the stator, and is a device that generates rotational motion by electromagnetic interaction between the stator and the rotor. Specifically, a coil is wound on the stator, and a magnet facing the coil is disposed on the rotor, so that the rotor can rotate by the action of the coil and magnet.

In general, motors being used in vehicles often connect multiple coils in parallel to reduce losses due to coil resistance. Therefore, when connecting in parallel, a method in which coils are extended up to an input/output terminal and comprehensively connected at the terminal is used.

Therefore, a bus bar module is disposed on an upper side of a stator to connect the coils disposed in parallel. The bus bar module is disposed to correspond to an upper surface of a stator and may include a bus bar for connection to the coil terminal. To implement a three-phase circuit, the bus bar includes a plurality of bus bars with different polarities.

However, a bus bar module according to the prior art has a problem in that miniaturization is difficult because the size of the motor increases due to an arrangement structure in which pluralities of bus bars are stacked along the axial direction.

DETAILED DESCRIPTION OF THE INVENTION

Technical Subject

The present embodiment is intended to provide a motor that can be miniaturized by improving the structure thereof.

In addition, it is intended to provide an electronic component module and a motor capable of improving production efficiency and lowering the manufacturing costs by improving the fastening structure between components.

Technical Solution

A motor according to the present embodiment comprises: a base; a first bus bar being coupled to the base and including a first body and a first coupling portion being extended from the first body; a second bus bar being disposed outside the first bus bar and including a second body and a second coupling portion being extended from the second body; and a third bus bar being disposed outside the second bus bar and including a third body and a third coupling portion being extended from the third body, wherein the first coupling portion is not overlapped with the second body and the third body in an axial direction, and the second coupling portion is not overlapped with the third body in an axial direction.

Upper surfaces of the first body, the second body, and the third body may be disposed on the same plane.

Each of the first body to third body may have a width greater than the height thereof.

The height of the first body to third body may be 5 mm or less.

The first body to third body may be formed in a closed shape.

When viewed from above, the second body may include an area being overlapped with the first coupling portion in a circumferential direction.

The second bus bar may be disposed between the first bus bar and the third bus bar.

A guide being protruded more upward than other areas is disposed on an upper surface of the base, and the first bus bar may include a guide hole into which the guide is coupled.

An upper surface of the guide may form a same plane as an upper surface of the first bus bar, an upper surface of the second bus bar, and an upper surface of the third bus bar.

Each of the first coupling portion, the second coupling portion, and the third coupling portion may include a hole through which a coil penetrates, and a protrusion to which the coil coupled.

Advantageous Effects

Through the present embodiment, there is an advantage in that the height of the bus bar module can be reduced compared to the past, making it easy to miniaturize the motor by disposing a plurality of bus bars being connected to coils of different polarities to form the same height.

In addition, since the connector for electrical connection between the electronic components and the coil is formed as one body, there is an advantage in that the production efficiency is improved by reducing assembly man-hours.

In addition, since terminals and connector terminals are disposed to be overlapped with each other within a single body, there is an advantage in that the size of the motor can be reduced compared to the prior art.

In addition, the connector terminal for electrical connection between the electronic component and the coil is implemented as a female connector structure, and the terminal is implemented as a male connector structure, so that the busbar module and the electronic component module can be coupled in a complementary manner.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention. In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used.

These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or disposed in "on (above)" or "below (under)" of each component, "on (above)" or "below (under)" means that it includes not only the case where the two components are directly in contact with, but also the case where one or more other components are formed or disposed between the two components. In addition, when expressed as "on (above)" or "below (under) ", the meaning of not only an upward direction but also a downward direction based on one component may be included.

Figure 1:
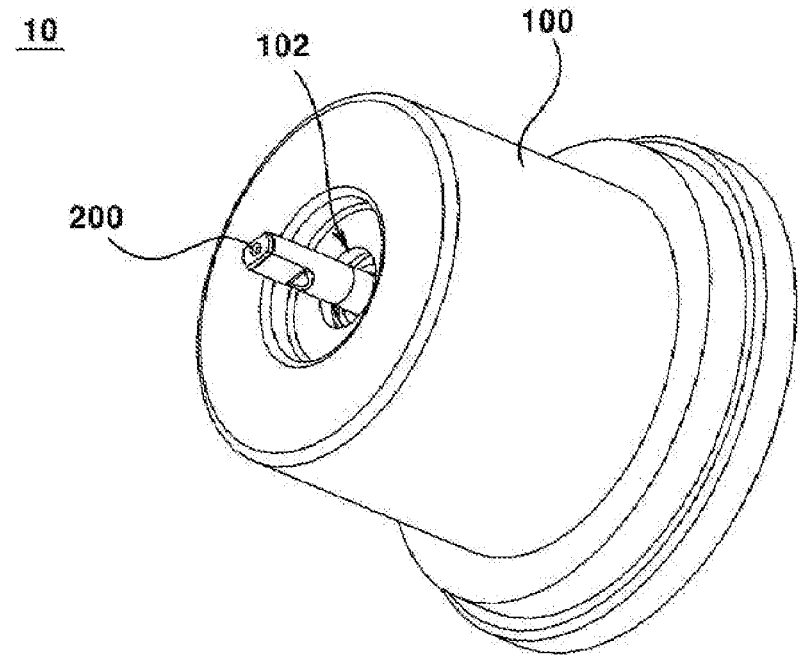
FIG. 1 is a perspective view of a motor according to a first embodiment of the present invention.
Figure 2:
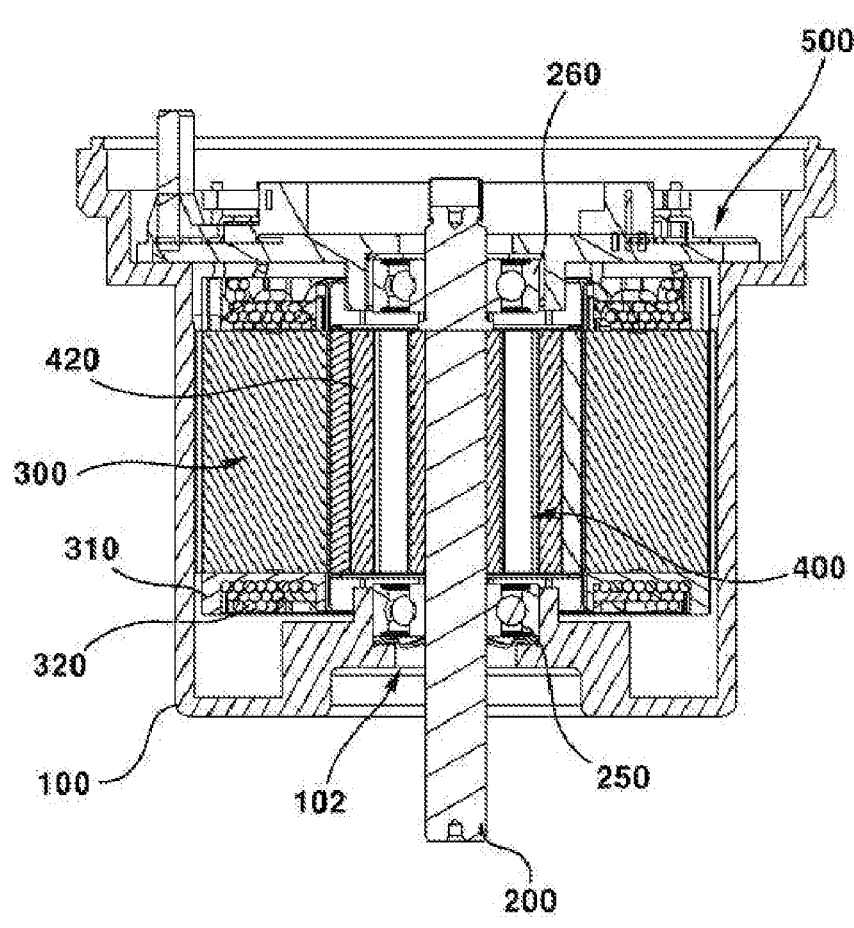
FIG. 2 is a cross-sectional view illustrating an internal configuration of a motor according to a first embodiment of the present invention.
Figure 3:
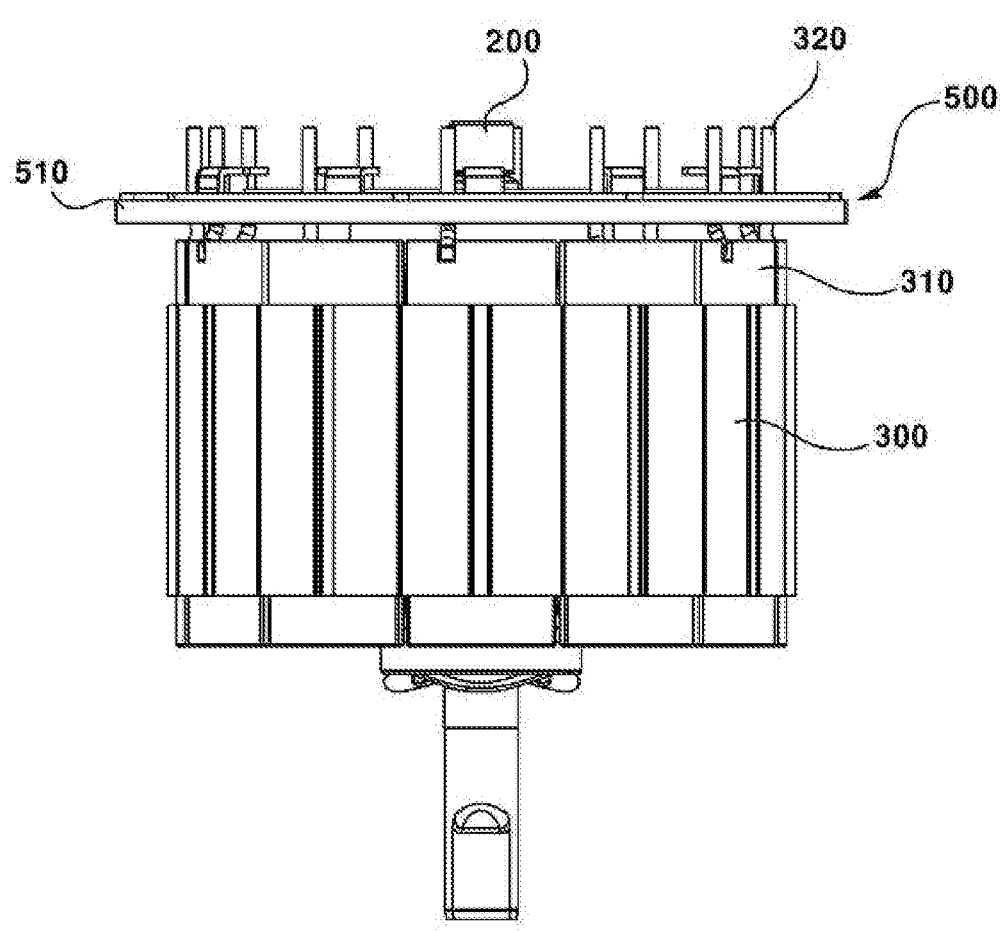
FIG. 3 is a plan view illustrating a side surface of a stator and a busbar module according to a first embodiment of the present invention.
Figure 4:
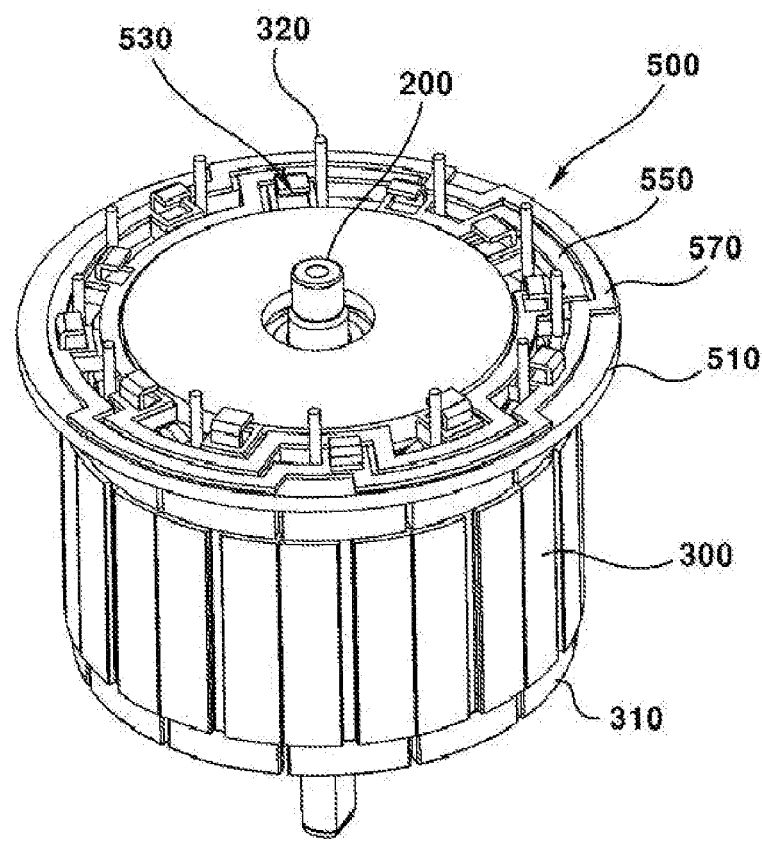
FIG. 4 is a perspective view of a stator and a busbar module according to a first embodiment of the present invention.
Figure 5:
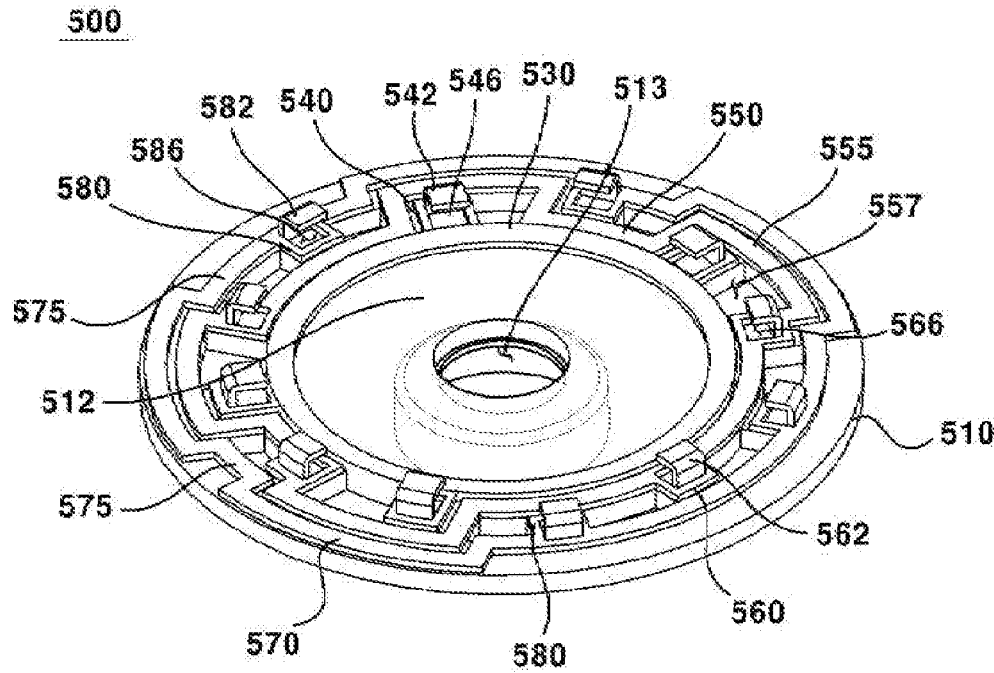
FIG. 5 is a perspective view of a busbar module according to a first embodiment of the present invention.
Figure 6:
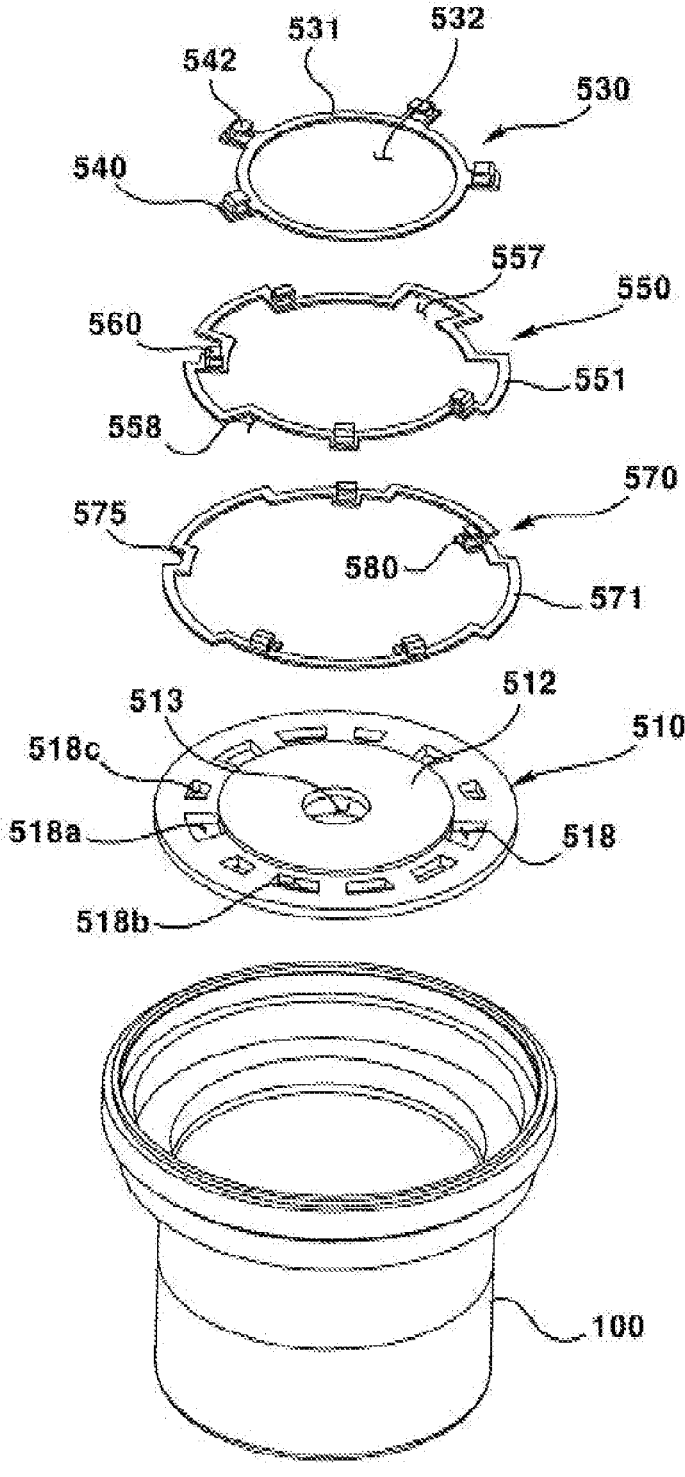
FIG. 6 is an exploded perspective view of a bus bar module according to a first embodiment of the present invention.
Figure 7:
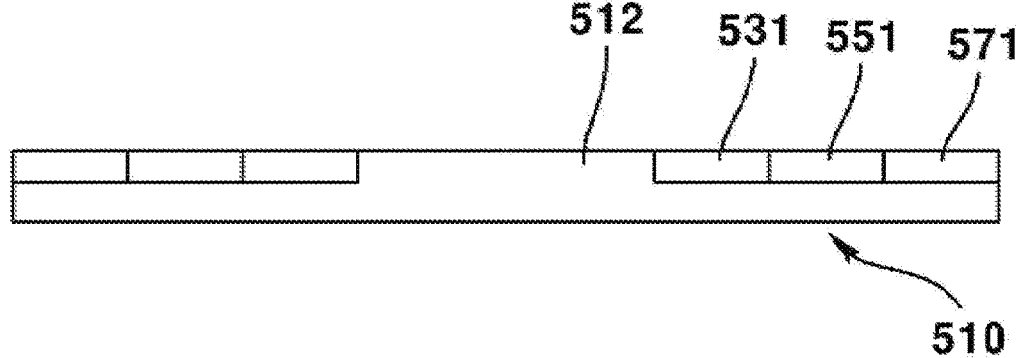
FIG. 7 is a plan view illustrating a side surface of a bus bar module according to a first embodiment of the present invention.

FIG. 1 is a perspective view of a motor according to a first embodiment of the present invention; FIG. 2 is a cross-sectional view illustrating an internal configuration of a motor according to a first embodiment of the present invention; FIG. 3 is a plan view illustrating a side surface of a stator and a busbar module according to a first embodiment of the present invention; FIG. 4 is a perspective view of a stator and a busbar module according to a first embodiment of the present invention; FIG. 5 is a perspective view of a busbar module according to a first embodiment of the present invention; FIG. 6 is an exploded perspective view of a bus bar module according to a first embodiment of the present invention; and FIG. 7 is a plan view illustrating a side surface of a bus bar module according to a first embodiment of the present invention.

Referring to FIGS. 1 to 7, the motor 10 according to a first embodiment of the present invention may comprise a housing 100, a stator 300, a rotor 400, a shaft 200, and a busbar module 500.

The housing 100 forms the external appearance of the motor 100, and a space in which the stator 300, the rotor 400, the shaft 200, and the bus bar module 500 are disposed may be formed inside. A hole may be formed in an upper or a lower surface of the housing 100 to allow the shaft 200 to penetrate through. The space inside the housing 100 may include a plurality of areas with different cross-sectional areas. For example, the plurality of areas may include a first area and a second area having a larger cross-sectional area than the first area. The stator 300 and the rotor 400 may be disposed in the first area, and the bus bar module 500 may be disposed in the second area.

The stator 300 may be placed inside the housing 100. A space in which the rotor 400 and the shaft 200 are disposed may be formed inside the stator 300. A coil 320 may be wound around the stator 300. For insulation, an insulator 310 may be disposed on an outer surface of the stator 300, and the coil 320 may be wound on an outer surface of the insulator 310.

Both ends of the coil 320 may be extended upward from the stator 300. Both ends of the coil 320 may be coupled to the bus bar module 500.

The coil 320 may comprise a first coil having a first polarity, a second coil having a second polarity, and a third coil having a third polarity.

The rotor 400 may be disposed inside the stator 300. The rotor 400 may include a rotor core and a magnet 420 being disposed on an outer surface of the rotor core. The magnet 420 may be disposed to face the coil 320. Therefore, the rotor 400 can be rotated by the electromagnetic interaction between the magnet 420 and the coil 320.

The shaft 200 may be coupled to the center of the rotor 400. The shaft 200 may rotate together with the rotor 400. Bearings 250 and 260 for supporting the rotation of the shaft 200 may be disposed in a space inside the housing 100. The bearings 250 and 260 may include a lower bearing 250 being disposed at a lower portion of the housing 100 and an upper bearing 260 being disposed at an upper portion of the housing 100.

The bus bar module 500 may be disposed on an upper portion of the stator 300. The bus bar module 500 may electrically connect the coil 320 and a controller (not shown). Accordingly, the output of the motor 10 can be controlled through the controller.

The bus bar module 500 may comprise a base 510, a first bus bar 530, a second bus bar 550, and a third bus bar 570.

The base 510 is made of an insulating material and may be disposed on an upper portion of the stator 300. The base 510 may have a plate shape. A shaft hole 513 may be formed in the center of the base 510 so that the shaft 200 penetrates therethrough. The first bus bar 530, the second bus bar 550, and the third bus bar 570 may be disposed on an upper surface of the base 510.

A guide 512 being protruded more upward than other areas may be disposed on an upper surface of the base 510. The guide 512 may be disposed in the central area of an upper surface of the base 510. The first bus bar 530 may be coupled to an outer surface of the guide 512.

The base 510 may include a plurality of holes 518. The plurality of holes 518 may be disposed outside the guide 512. The plurality of holes 518 may be disposed radially with respect to the center of the base 510. A plurality of holes 518 may be provided and disposed to be spaced apart from one another along a circumferential direction.

The plurality of holes 518 may be formed to penetrate from the upper surface to the lower surface of the base 510. The coil 320 being wound around the stator 300 may be extended upward from the base 510 through the plurality of holes 518. That is, the coil 320 may be disposed to penetrate the plurality of holes 518.

The plurality of holes 518 may include a first hole 518a, a second hole 518b, and a third hole 518c. The first to third holes 518a, 518b, and 518c may have different cross-sectional areas. For example, the cross-sectional area of the second hole 518b may be smaller than that of the first hole 518a and larger than that of the third hole 518c.

The polarity of power source of the coils 320 penetrating through the first to third holes 518a, 518b, and 518c may be different from one another. For example, the coil 320 penetrating through the first hole 518a has a U-phase power source, the coil 320 penetrating through the second hole 518b has a V-phase power source, and the coil 320 penetrating the third hole 518c may have a W-phase power source.

Each of the first hole to third hole 518a, 518b, and 518c may be provided in plural numbers and disposed to be spaced apart along a circumferential direction. Accordingly, the second hole 518b and the third hole 518c may be disposed between adjacent first holes 518a; the third hole 518c and the first hole 518a may be disposed between the adjacent second holes 518b; and the second hole 518b and the first hole 518a may be disposed between the adjacent third holes 518c.

Meanwhile, the first to third bus bars 530, 550, and 570 may be integrally coupled to the base 510 by insert injection molding. However, this is an example, and the first to third bus bars 530, 550, and 570 may be stacked on the base 510.

The first bus bar 530 may be disposed on the base 510. The first bus bar 530 may have a ring-shaped cross section. A guide hole 532 may be formed in the center of the first bus bar 530. The cross-sectional shape of the guide hole 532 may be formed to correspond to the cross-sectional shape of the guide 512. The first bus bar 530 may be coupled to the guide 512 through the guide hole 532. In this case, the side surface of the guide 512 may be in contact with the inner surface of the first bus bar 530 where the guide hole 532 is formed.

The first bus bar 530 may include a first body 531. The first body 531 may have a closed loop shape.

The height of the first bus bar 530 in an up and down direction may correspond to the height of the guide 512 being protruded from an upper surface of the base 510. Accordingly, the upper surface of the first bus bar 530 may form the same plane as the upper surface of the guide 512.

The first bus bar 532 may be coupled to a first coil. To this end, the first bus bar 532 may include a first coupling portion 540. The first coupling portion 540 may have a shape being extended outward from the first body 531. The first coupling portion 540 may have a shape being protruded radially outward from other areas. The first coupling portion 540 may be provided in plural numbers and disposed to be spaced apart from one another along a circumferential direction.

The first bus bar 530 may be formed of a metal material.

The first coupling portion 540 may include a first hole 546 penetrating from an upper surface to a lower surface, and a first protrusion 542 being disposed on an upper portion of the first hole 546. The first coil may pass through the first hole 546 and be coupled to the first protrusion 542. The first coil may be fused with the first protrusion 542. The first coil may be fused to a lower surface of the first protrusion 542. The first protrusion 542 may have an area being bent at least once, and more. The first protrusion 542 may be disposed to be overlapped with the first hole 546 in an up and down direction.

The first protrusion 542 is formed by cutting and bending a portion of the first coupling portion 540, and the cut area generated during the formation of the first protrusion 542 may be the first hole 546.

The first coupling portion 540 may be disposed so as not to be overlapped in an axial direction with the second body 551 of the second bus bar 550 and the third body 571 of the third bus bar 570, which will be described later.

The second bus bar 550 may be disposed on the base 510. The second bus bar 550 may be disposed outside the first bus bar 530 in a radial direction. The second bus bar 550 may be spaced apart from the first bus bar 530 by a predetermined distance. An insulating sheet (not shown) may be disposed between the second bus bar 550 and the first bus bar 530.

The second bus bar 550 may include a second body 551. The second body 551 may have a ring-shaped cross section. The second body 551 may have a closed loop shape. When viewed from above, the second body 551 may include an area where at least a portion of the second body 551 is overlapped with the first coupling portion 540 in a circumferential direction.

The height of the second bus bar 550 in an up and down direction may correspond to the height of the first bus bar 530 in an up and down direction and the height of the guide 512 protruded from an upper surface of the base 510. Accordingly, the upper surface of the second bus bar 550, the upper surface of the first bus bar 530, and the upper surface of the guide 512 may form the same plane.

A first groove 557 may be formed on an inner surface of the second bus bar 550 facing the first bus bar 530. The first groove 557 may have a shape being recessed radially more outward than other areas. The first coupling portion 540 of the first bus bar 530 may be disposed in the first groove 557.

A second groove 558 may be disposed on an outer surface of the second bus bar 550 facing the third bus bar 570. The second groove 558 may have a shape being recessed radially more inward than other areas. The first protrusion 575 of the third bus bar 570, which will be described later, may be disposed in the second groove 558.

By the first groove 557 and the second groove 558, the second bus bar 550 may have a plurality of areas having different lengths from the center in a radial direction. The first grooves 557 and the second grooves 558 may be alternately disposed along a circumferential direction of the second bus bar 550. The first groove 557 and the second groove 558 may have an area being at least partially overlapped with each other along a circumferential direction.

The second bus bar 550 may be coupled with the second coil. To this end, the second bus bar 550 may include a second coupling portion 560. The second coupling portion 560 may be extended from the second body 551. Pluralities of second coupling portions 560 may be provided and disposed to be spaced apart from one another along a circumferential direction. Some of the pluralities of second coupling portions 560 are disposed between the first groove 557 and the second groove 558 in a circumferential direction, and others may be disposed to be protruded outward from the bottom surface of the second groove 558.

The second bus bar 560 may be formed of a metal material.

The second coupling portion 560 may include a second hole 566 penetrating from an upper surface to a lower surface, and a second protrusion 562 being disposed on an upper portion of the second hole 566. The second coil may pass through the second hole 566 and be coupled to the second protrusion 562. The first coil may be fused with the second protrusion 562. The second coil may be fused to a lower surface of the second protrusion 562. The second protrusion 562 may have an area being bent at least once, and more. The second protrusion 562 may be disposed to be overlapped with the second hole 566 in an up and down direction.

The second protrusion 562 is formed by cutting and bending a portion of the second coupling portion 560, and the cut area created during the formation of the second protrusion 562 may be the second hole 566.

The second coupling portion 560 may be disposed so as not to be overlapped in an axial direction with the third body 571 of the third bus bar 570, which will be described later.

The third bus bar 570 may be disposed on the base 510. The third bus bar 570 may be disposed outside the first bus bar 530 and the second bus bar 550 in a radial direction. The third bus bar 570 may be spaced apart from the second bus bar 550 by a predetermined distance. An insulating sheet (not shown) may be disposed between the third bus bar 570 and the second bus bar 550.

The third bus bar 570 may have a ring-shaped cross section. The third bus bar 570 may include a third body 571 of a closed loop shape. The height of the third bus bar 570 in an up and down direction may correspond to the height of the first bus bar 530 and the second bus bar 550 in an up and down direction, and the height of the guide 512 being protruded from an upper surface of the base 510. Accordingly, the upper surface of the third bus bar 570 may form the same plane as the upper surface of the first bus bar 530, the upper surface of the second bus bar 550, and the upper surface of the guide. In other words, the upper surfaces of the first body 531, the second body 551, and the third body 571 may be disposed to form the same plane.

A first protrusion 575 being protruded radially more inward than other areas may be disposed on an inner surface of the third bus bar 570 facing the second bus bar 550. Due to the first protrusion 575, the outer surface of the third bus bar 570 being overlapped with the first protrusion 575 in a radial direction, may have a groove shape. The first protrusion 575 may be disposed at least partially inside the second groove 558 of the second bus bar 550.

Due to the first protrusion 575, the third bus bar 570 may have a plurality of areas having different lengths from the center in a radial direction.

The third bus bar 570 may be coupled with the third coil. To this end, the third bus bar 570 may include a third coupling portion 580. The third coupling portion 580 may be extended from the third body 571. A plurality of third coupling portions 580 may be provided and disposed to be spaced apart from one another along a circumferential direction. The third coupling portion 580 may be disposed to be protruded inward from the first protrusion 575.

The third bus bar 570 may be formed of a metal material.

The third coupling portion 580 may include a third hole 586 penetrating from an upper surface to a lower surface, and a third protrusion 582 being disposed on an upper portion of the third hole 586. The third coil may pass through the third hole 586 and be coupled to the third protrusion 582. The first coil may be fused with the third protrusion 582. The second coil may be fused to a lower surface of the third protrusion 582. The third protrusion 582 may have an area being bent at least once, and more. The third protrusion 582 may be disposed to be overlapped with the third hole 586 in an up and down direction.

The third protrusion 582 is formed by cutting and bending a portion of the third coupling portion 580, and the cut area created during the formation of the third protrusion 582 may be the second hole 566.

Meanwhile, the first coupling portion 540, the second coupling portion 560, and the third coupling portion 580 may be disposed not to be overlapped with one another in a radial direction of the bus bar module 500. In addition, the first coupling portion 540, the second coupling portion 560, and the third coupling portion 580 may be disposed to be overlapped with one another at least partially in a circumferential direction of the bus bar module 500.

Each of the first body 531, the second body 551, and the third body 571 may have a radial width greater than the axial height. As an example, the height of each of the first body 531, the second body 551, and the third body 571 may be formed to be 5 mm or less.

Meanwhile, in the present specification, the first to third protrusions 542, 562, and 582 are formed by cutting from the first to third coupling portions 540, 560, and 580, respectively, however, this is an example, and the first to third protrusions 542, 562, and 582 may be formed by cutting a portion of the first to third bodies 531, 551, and 571. In this case, holes may not be formed in the first to third coupling portions 540, 560, and 580.

According to the above structure, a plurality of bus bars being connected to coils of different polarities are disposed to form the same height, so that the height of the bus bar module can be reduced compared to the prior art, and there is an advantage in that it is easy to miniaturize the motor.

Hereinafter, an electronic component module and a motor according to a second embodiment will be described.

Figure 8:
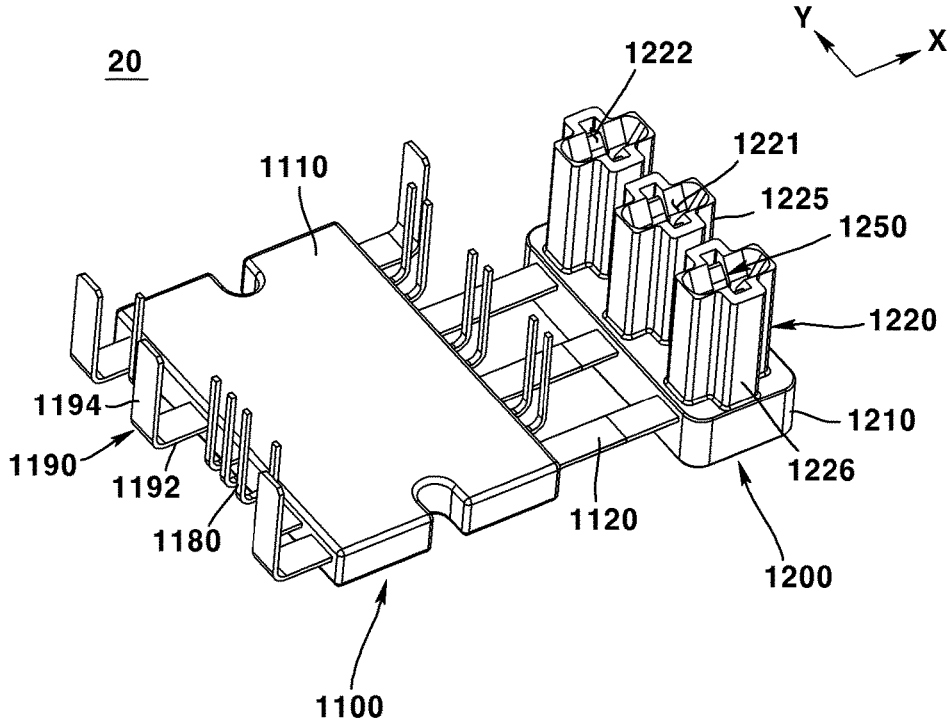
FIG. 8 is a perspective view of an electronic component module according to a second embodiment of the present invention.
Figure 9:
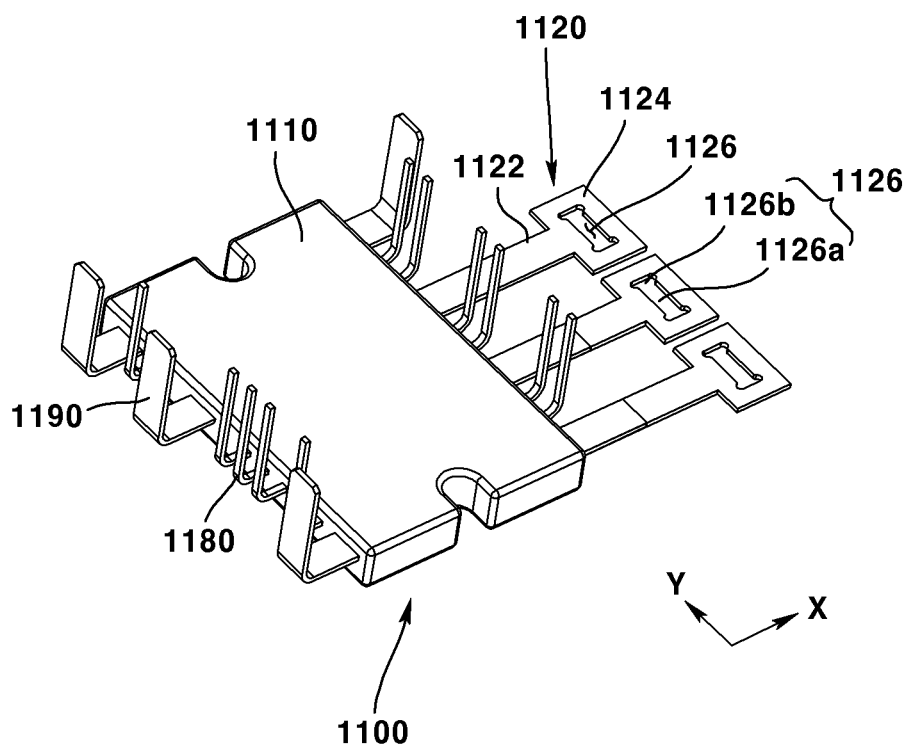
FIG. 9 is a perspective view of an electronic component module according to a second embodiment of the present invention.
Figure 10:
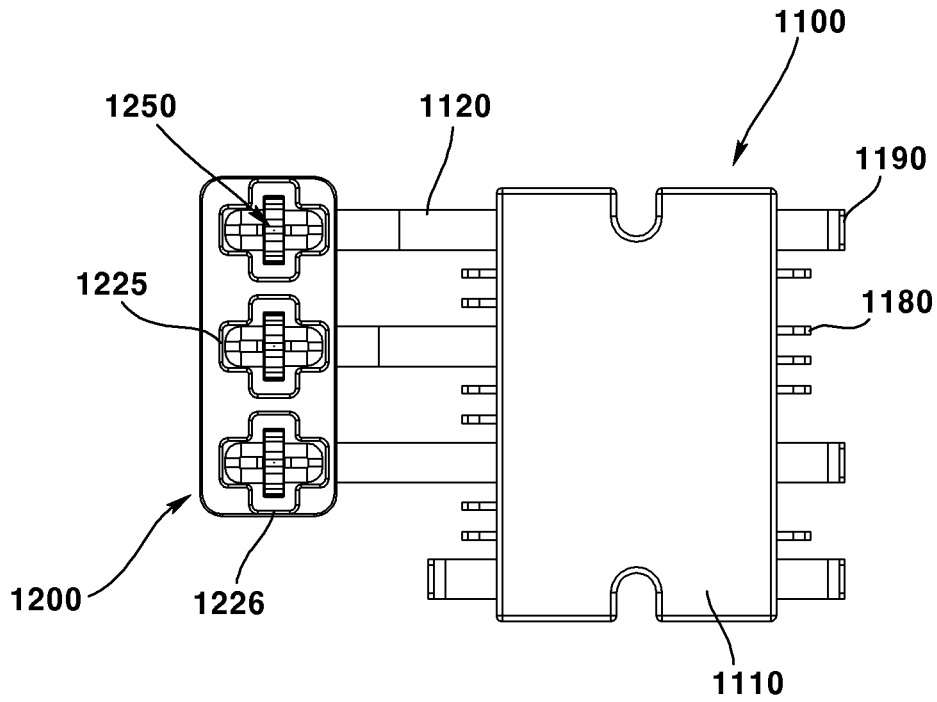
FIG. 10 is a plan view illustrating an upper surface of an electronic component module according to a second embodiment of the present invention.
Figure 11:
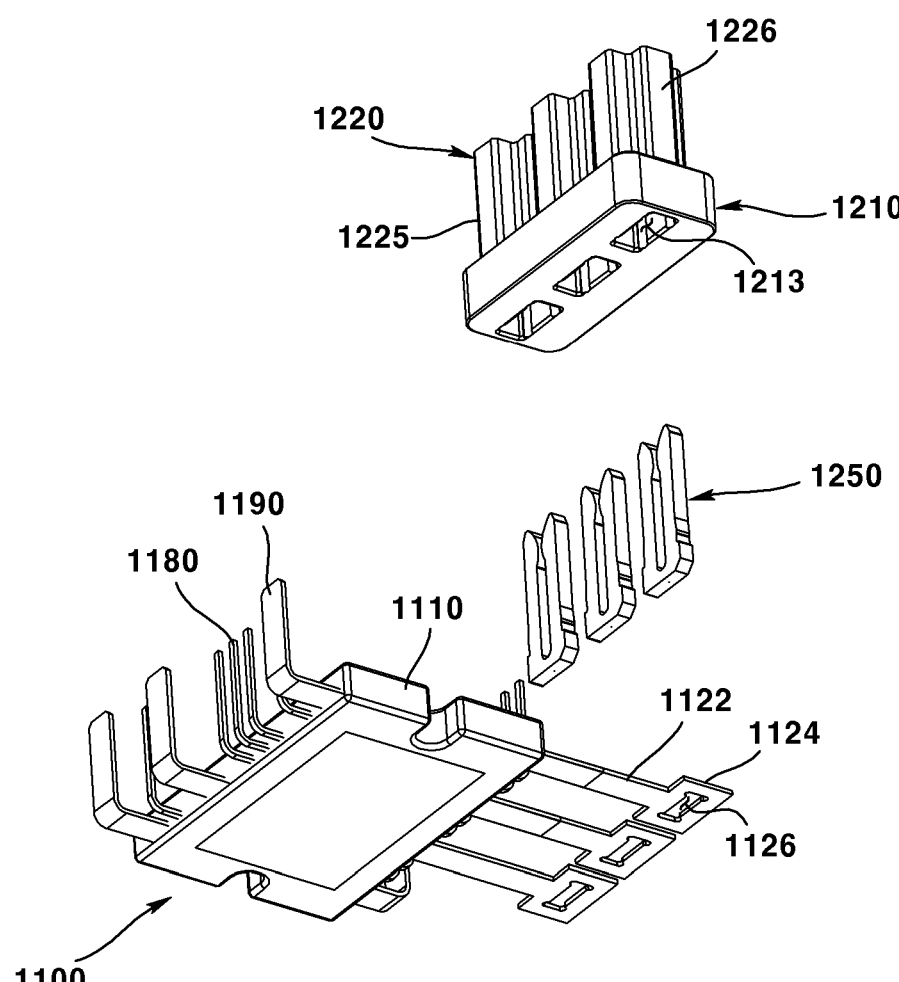
FIG. 11 is an exploded perspective view of an electronic component module according to a second embodiment of the present invention.
Figure 12:
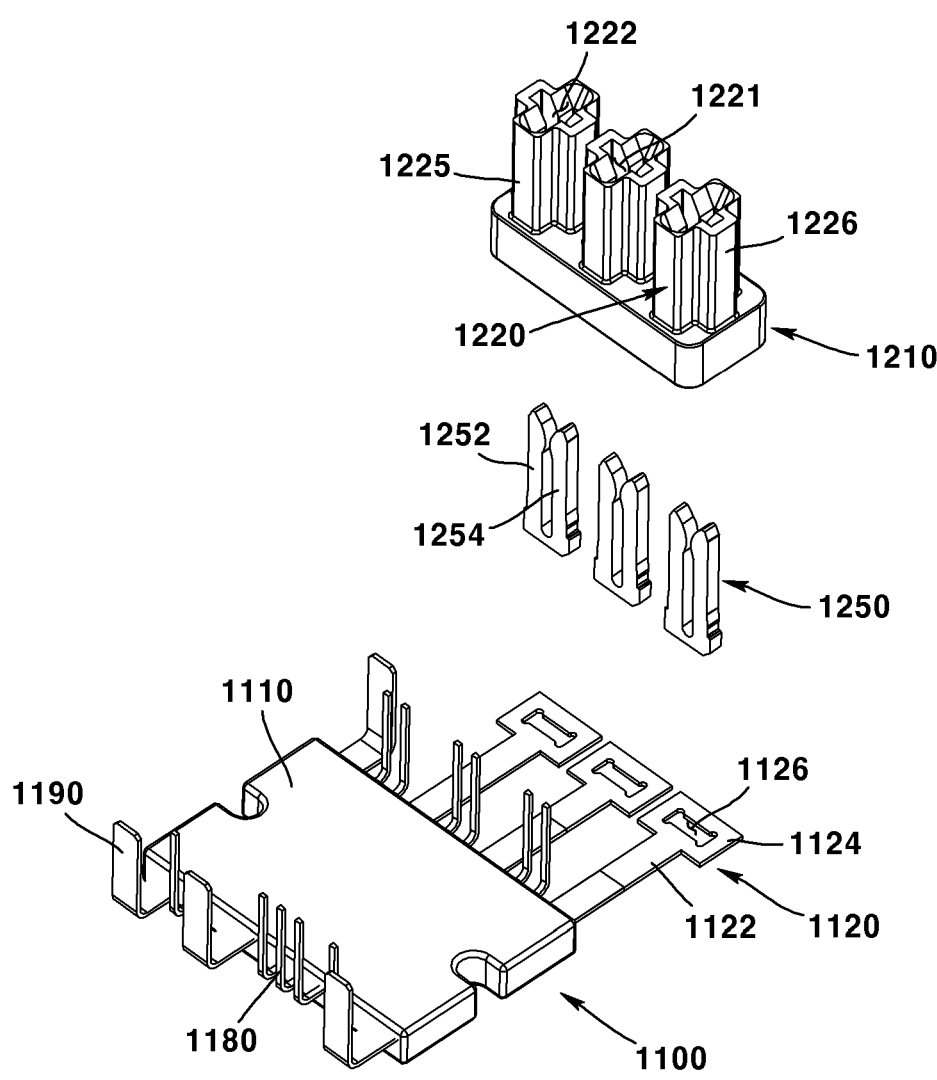
FIG. 12 is a view illustrating FIG. 4 from another angle.
Figure 13:
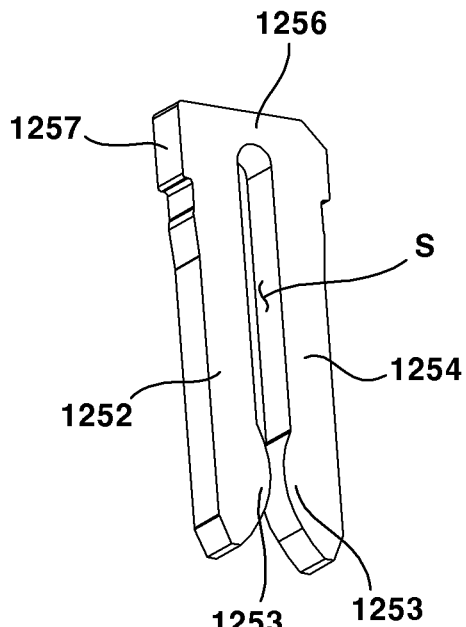
FIG. 13 is a perspective view of a connector terminal according to a second embodiment of the present invention.

FIG. 8 is a perspective view of an electronic component module according to a second embodiment of the present invention; FIG. 9 is a perspective view of an electronic component module according to a second embodiment of the present invention; FIG. 10 is a plan view illustrating an upper surface of an electronic component module according to a second embodiment of the present invention; FIG. 11 is an exploded perspective view of an electronic component module according to a second embodiment of the present invention; FIG. 12 is a view illustrating FIG. 4 from another angle; and FIG. 13 is a perspective view of a connector terminal according to a second embodiment of the present invention.

Referring to FIGS. 8 to 13, an electronic component module 20 according to a second embodiment of the present invention may include an electronic component 1100 and a connector 1200. The electronic component module 20 according to a second embodiment of the present invention can be implemented as a single module by coupling the electronic component 1100 and the connector 1200. The electronic component 1100 and the connector 1200 may be electrically connected to each other. The electronic component 1100 and the connector 1200 may be coupled in a first direction X.

The electronic component 1100 is a component for driving a motor, which will be described later, and can be electrically connected to other components inside the motor. For example, the electronic component 1100 may be an automotive power module (APM) for controlling current inside the motor, which will be described later, but this is an example, and the electronic component 1100 may include various components for driving the motor.

The electronic component 1100 may include a core 1110 and one or more leads 1120, 1180, and 1190 being extended from the core 1110.

The core 1110 may form the body of the electronic component 1100. The core 1110 may have a plate shape with a rectangular cross-section. The core 1110 may be disposed to be spaced apart from the connector 1200 in a first direction X.

The leads 1120, 1180, and 1190 may be extended outward from the core 1110. The leads 1120, 1180, and 1190 may include a first lead 1120. The first lead 1120 may be extended from the core 1110 and coupled to the connector 1200. One end of the first lead 1120 may be connected to the core 1110, and the other end of the first lead 1120 may be connected to the connector 1200.

The first lead 1120 may include: an extension portion 1122 being extended from the core 1110; and a coupling portion 1124 being disposed at an end portion of the extension portion 1122 and coupled to the connector 1200. The extension portion 1122 may have a bar shape. The coupling portion 1124 may have a larger width than the extension portion 1122 and may have a rectangular cross-section. Here, the width may be the length defined in a second direction Y perpendicular to the first direction X. When coupling the electronic component 1100 and the connector 1200, at least a portion of the coupling portion 1124 and the extension portion 1122 may be disposed in the first body 1210 of the connector 1200, which will be described later.

The coupling portion 1124 may include a first coupling hole 1126. The first coupling hole 1126 may be formed to penetrate from an upper surface to a lower surface of the coupling portion 1124. A connector terminal to be described later may be coupled to the first coupling hole 1126. The first coupling hole 1126 may include a central area 1126a and an edge area 1126b being disposed on both sides of the central area 1126a. The plurality of edge areas 1126b and the central area 1126a may be disposed along the second direction Y. The width of the edge area 1126b may be larger than the width of the central area 1126a. The length of the edge area 1126b in a first direction X may be greater than the length of the central area 1126a in a first direction X.

The first lead 1120 may be provided in plural numbers. For example, the first lead 1120 may be provided 3 each and disposed to be spaced apart from one another. Power sources of different polarities may be applied to the plurality of first leads 1120.

The leads 1120, 1180, and 1190 may include a second lead 1180 and a third lead 1190. Each of the second lead 1180 and the third lead 1190 may be disposed to be extended outward from the core 1110. Each of the second lead 1180 and the third lead 1190 may have an area bent at least once, and more. The second lead 1180 and the third lead 1190 may have different shapes. For example, the cross-sectional area of the second lead 1180 may be smaller than that of the third lead 1190. The second lead 1180 and the third lead 1190 may be coupled to a printed circuit board 1600 (refer to FIG. 15), which will be described later. The second lead 1180 and the third lead 1190 may be mounted on the printed circuit board 1600.

Each of the second lead 1180 and the third lead 1190 may be provided in plural numbers and disposed to be spaced apart from one another.

The connector 1200 is spaced apart from the electronic component 1100 in a first direction X and may be connected to the electronic component 1100 through the first lead 1120. The connector 1200 may include a body forming an external shape and a connector terminal 1250 being disposed inside the body.

The body is made of plastic material and can form the external shape of the connector 1200. The body may be referred to as a housing in that it accommodates the connector terminal 1250 inside. The body may include a first body 1210 and a second body 1220 being extended from one surface of the first body 1210. The body may be made of plastic material.

Figure 14:
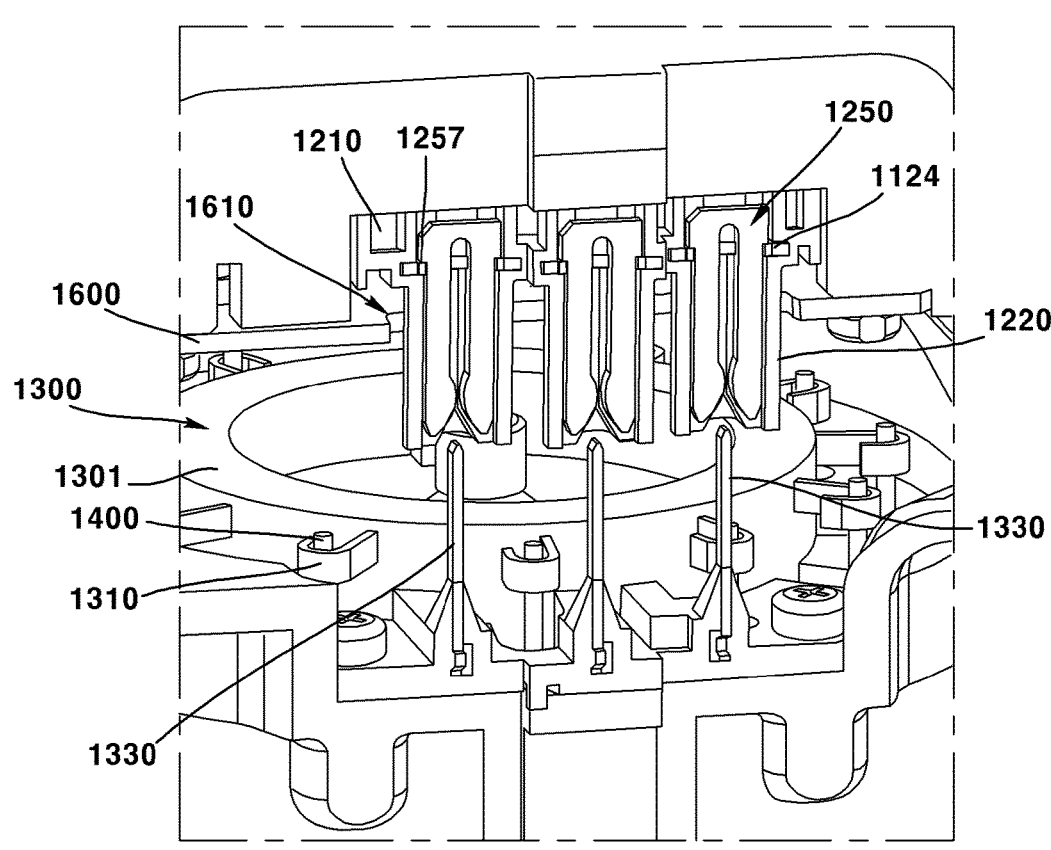
FIGS. 14 and 15 are diagrams illustrating an assembly process of a bus bar module and an electronic component module according to a second embodiment of the present invention.
Figure 15:
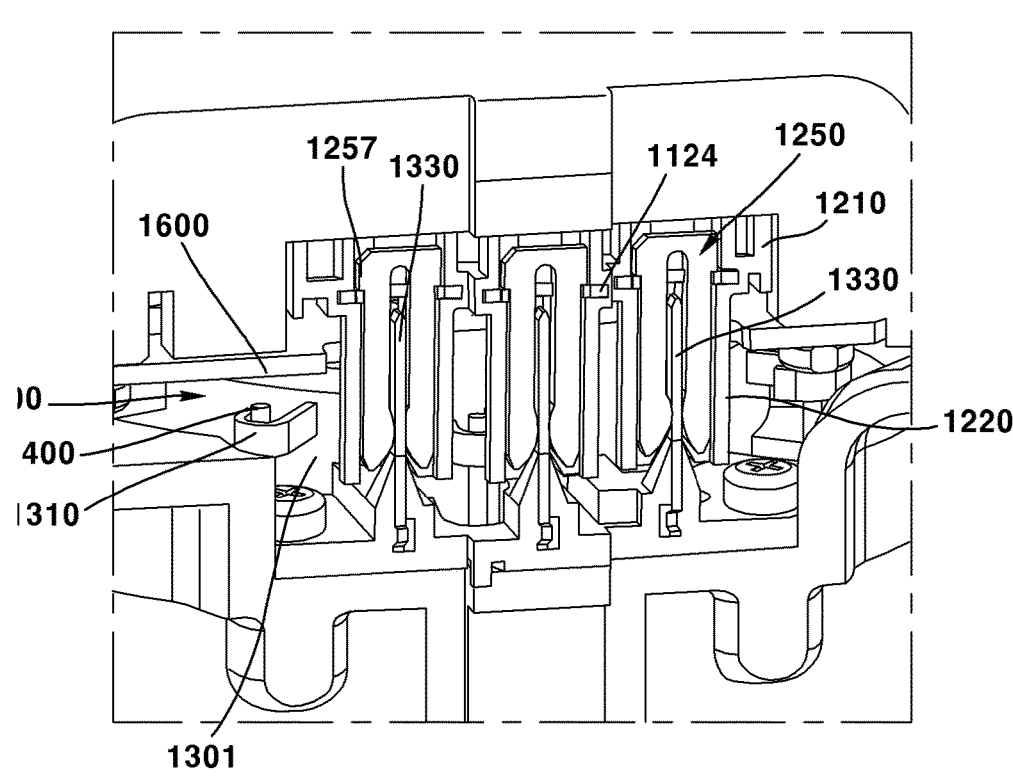

FIGS. 8 and 9 illustrate the upper and lower surfaces of the electronic component module 120 interchanged for convenience of explanation. As illustrated in FIGS. 14 and 15, the second body 1220 may be formed to be protruded downward from a lower surface of the first body 1210 with respect to the motor.

The first body 1210 may have a rectangular cross-sectional shape. At least a portion of the first body 1210 may be disposed to be overlapped with the core 1110 in a first direction X. A second coupling hole 1213 to which the connector terminal 1250 is coupled may be formed on an upper surface of the first body 1210. The second coupling hole 1213 is extended downward from an upper surface of the first body 1210 and may communicate with a space inside the second body 1220, which will be described later.

The first lead 1120 may be coupled to a side surface of the first body 1210. The first lead 1120 may penetrate the side surface of the first body 1210 and at least a portion of the first lead 1120 may be disposed in a space inside the first body 1210. At least a portion of the extension portion 1122 of the first lead 1120 and the coupling portion 1124 may penetrate the side surface of the first body 1210 and be disposed inside the first body 1210. When the first lead 1120 is coupled to the first body 1210, the first coupling hole 1126 of the coupling portion 1124 may be disposed to be overlapped with the second coupling hole 1213.

The body may be formed integrally with the first lead 1120 by insert injection. In other words, the electronic component 1100 and the connector 1200 may be understood as being integrally formed by insert injection molding.

The second body 1220 is protruded downward from a lower surface of the first body 1210 and can accommodate at least a portion of the connector terminal 1250 inside. The second body 1220 may have a space formed therein to accommodate the connector terminal 1250 and a terminal 1330 (refer to FIGS. 14 and 15), which will be described later. The lower surface of the space inside the second body 1220 may be opened to allow a terminal 1330, which will be described later, to be coupled thereto.

The space may include a first space 1221 to which at least a portion of the connector terminal 1250 is coupled, and a second space 1222 to which the terminal 1330 is coupled. Due to the first space 1221 and the second space 1222, the space or the cross-sectional shape of the second body 1220 may be formed in a "+" shape, that is, a cross shape. The lengthwise direction of the first space 1221 may be defined as the second direction Y, and the lengthwise direction of the second space 1222 may be defined as the first direction X. The first space 1221 and the second space 1222 are connected to each other at the center and may be disposed to cross each other. The first space 1221 and the second space 1222 may be disposed to be perpendicular to each other.

The length of the connector terminal 1250 in a second direction Y may correspond to the length of the first space 1221 in a first direction Y. The length of the terminal 1330 in a first direction X may correspond to the length of the second space 1222 in a first direction X.

A first protruded portion 1226 and a second protruded portion 1225 may be formed on a side surface of the second body 1220. A plurality of first protruded portions 1226 is provided and may be disposed to face one another in the second direction Y. A plurality of second protruded portions 1225 is provided and may be disposed to face one another in the first direction X. The first protruded portion 1226 is understood as an area where the first space 1221 is formed inside, and the second protruded portion 1225 may be understood as an area where the second space 1222 is formed inside.

A plurality of second bodies 1220 may be provided corresponding to the number of first leads 1120. A plurality of second bodies 1220 may be disposed to be spaced apart from one another at a lower portion of the first body 1210.

The connector terminal 1250 may be disposed inside the body. At least a portion of the connector terminal 1250 may be disposed inside the first body 1210, and the remaining portion may be disposed in the second body 1220. The connector terminal 1250 may be coupled to penetrate the first coupling hole 1126 inside the first lead 1120. The connector terminal 1250 may be disposed perpendicular to the first lead 1120.

As illustrated in FIG. 13, the connector terminal 1250 may include a first terminal 1252 and a second terminal 1254. The first terminal 1252 and the second terminal 1254 may form a pair with one end being connected to each other and the other end being spaced apart from each other. A separation portion S is formed between the first terminal 1252 and the second terminal 1254, and the first terminal 1252 and the second terminal 1254 may be disposed to face each other about the separation portion S.

At one end of the connector terminal 1250, where the first terminal 1252 and the second terminal 1254 are connected to each other, an expansion portion 1257 being protruded from a side surface thereof may be formed. The width of the expansion portion 1257 may be larger than that of other areas inside the connector terminal 1250. The width of the expansion portion 1257 may be larger than the width of the first coupling hole 1126.

The expansion portion 1257 may be disposed inside the first body 1210. The expansion portion 1257 may be disposed at an upper portion of the coupling portion 1124 of the first lead 1120 (refer to FIG. 15). At least a portion of the expansion portion 1257 may be disposed to be overlapped with the separation portion S in a horizontal direction.

A contact portion 1253 may be formed at the other end of the connector terminal 1250, where the first terminal 1252 and the second terminal 1254 are spaced apart from each other. The contact portion 1253 may be formed to be protruded inward from inner surfaces in which the first terminal 1252 and the second terminal 1254 are facing each other. The area of the first terminal 1252 and the second terminal 1254 where the contact portion 1253 is formed may be formed to be wider than other areas. The contact portion 1253 may be in contact with an outer surface of the terminal 1330 (refer to FIGS. 14 and 15).

The first terminal 1252 and the second terminal 1254 may have elastic force in a direction in which the other ends being formed with the contact portion 1253 are getting closer to each other.

According to the above structure, since the electronic component 1100 and the connector 1200 for electrical connection with other components inside a motor are formed as one body, there is an advantage is that the production efficiency is improved by reducing assembly man-hours. In addition, since the terminal and connector terminal are disposed to be overlapped with each other inside a single body, there is an advantage in that the size of the motor can be reduced compared to the prior art.

FIGS. 14 and 15 are diagrams illustrating an assembly process of a bus bar module and an electronic component module according to a second embodiment of the present invention.

Referring to FIGS. 14 and 15, the motor according to a second embodiment of the present invention may include a housing, a stator being disposed inside the housing, and a rotor being disposed inside the stator. A coil is wound around the stator, and a magnet facing the coil is disposed in the rotor, so that the rotor can rotate due to an electromagnetic interaction between the coil and the magnet.

A busbar module 1300 may be disposed on the stator. The busbar module may comprise: a bus bar body 1301; a plurality of bus bars 1310 being protruded from an outer surface of the bus bar body 1301 and to which the coil 1400 of the stator is connected; and a terminal 1330 being disposed on the bus bar body 1301 and electrically connecting the plurality of bus bars 1310 and the electronic component module 20. Since three-phase power is applied to the coil, three terminals 1330 may be provided corresponding to the number of power sources. Therefore, when the electronic component module 20 and the bus bar module 1300 are coupled, current can be inputted and outputted from the electronic component 1100 to the coil.

A printed circuit board 1600 may be disposed at an upper portion of the bus bar module 1300, and the printed circuit board 1600 may include a hole 1610 through which the second body 1220 of the electronic component module 20 may penetrates.

When the electronic component module 20 is coupled to the bus bar module 1300, the terminal 1330 may be coupled to the second body 1220. The terminal 1330 may be introduced into the space inside the second body 1220 through an opening at a lower surface of the second body 1220.

The terminal 1330 may be coupled to the second space 1222 inside the second body 1220. Inside the second body 1220, the terminal 1330 may be disposed to intersect the connector terminal 1250 disposed inside the first space 1221. The terminal 1330 may be disposed perpendicular to the connector terminal 1250. The terminal 1330 may be coupled to the separation portion S of the connector terminal 1250. The terminal 1330 may be disposed between the first terminal 1252 and the second terminal 1254. The contact portion 1253 may be in contact with both sides of the terminal 1330, respectively. The terminal 1330 may be disposed below the first lead 1120.

Therefore, according to the present embodiment, the connector terminal 1250 for electrical connection between the electronic component 1100 and the coil is implemented as a female connector structure, and the terminal 1330 is implemented as a male connector structure, so that the busbar module 1300 and the electronic component module 20 can be complementarily coupled.

In the above description, it is described that all the components constituting the embodiments of the present invention are combined or operated in one, but the present invention is not necessarily limited to these embodiments. In other words, within the scope of the present invention, all of the components may be selectively operated in combination with one or more. In addition, the terms "comprise", "include" or "having" described above mean that the cor- responding component may be inherent unless specifically stated otherwise, and thus it should be construed that it does not exclude other components, but further include other components instead. All terms, including technical and scientific terms, have the same meaning as commonly under- stood by one of ordinary skill in the art unless otherwise defined. Terms used generally, such as terms defined in a dictionary, should be interpreted to coincide with the con- textual meaning of the related art, and shall not be inter- preted in an ideal or excessively formal sense unless explic- itly defined in the present invention.

The above description is merely illustrative of the tech- nical idea of the present invention, and those skilled in the art to which the present invention pertains may make various modifications and changes without departing from the essen- tial characteristics of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be inter- preted as being included in the scope of the present inven- tion.

The invention claimed is:

1. A motor comprising:
a base;
a first bus bar being coupled to the base and including a first body and a first coupling portion being extended from the first body;
a second bus bar being disposed outside the first bus bar and including a second body and a second coupling portion being extended from the second body; and
a third bus bar being disposed outside the second bus bar and including a third body and a third coupling portion being extended from the third body,
wherein the first coupling portion is not overlapped with the second body and the third body in an axial direc- tion,
wherein the second coupling portion is not overlapped with the third body in an axial direction,
wherein the first body, the second body, and the third body are arranged to overlap in a radial direction,
wherein a guide being protruded more upward than other areas is disposed on an upper surface of the base, wherein the first bus bar includes a guide hole into which the guide is coupled, and
wherein an upper surface of the guide forms a same plane as an upper surface of the first bus bar, an upper surface of the second bus bar, and an upper surface of the third bus bar.

2. The motor according to claim 1,
wherein an upper surfaces of the first body, the second body, and the third body are disposed on the same plane.

3. The motor according to claim 1,
wherein each of the first body to third body has a width greater than the height thereof.

4. The motor according to claim 1,
wherein the height of the first body to third body is 5 mm or less.

5. The motor according to claim 1,
wherein the first body to third body is formed in a closed loop shape.

6. The motor according to claim 1,
wherein when viewed from above, the second body includes an area being overlapped with the first cou- pling portion in a circumferential direction.

7. The motor according to claim 1,
wherein the second bus bar is disposed between the first bus bar and the third bus bar.

8. The motor according to claim 1, wherein the first to third bus bars are formed integrally with the base through insert injection molding.

9. A motor comprising:
a base;
a first bus bar being coupled to the base and including a first body and a first coupling portion being extended from the first body;
a second bus bar being disposed outside the first bus bar and including a second body and a second coupling portion being extended from the second body; and
a third bus bar being disposed outside the second bus bar and including a third body and a third coupling portion being extended from the third body,
wherein the first coupling portion is not overlapped with the second body and the third body in an axial direc- tion,
wherein the second coupling portion is not overlapped with the third body in an axial direction,
wherein the first body, the second body, and the third body are arranged to overlap in a radial direction,
wherein each of the first coupling portion, the second coupling portion, and the third coupling portion includes a hole through which a coil penetrates, and a protrusion to which the coil coupled,
wherein the base includes a first hole through which the first coil passes, a second hole through which the second coil passes, and a third hole through which the third coil passes,
wherein the first to third coils have different polarities, and
wherein the first hole, the second hole, and the third hole have different cross-sectional areas.

10. A motor comprising:
a base;
a first bus bar being coupled to the base and including a first body and a first coupling portion being extended from the first body;
a second bus bar being disposed outside the first bus bar and including a second body and a second coupling portion being extended from the second body; and a third bus bar being disposed outside the second bus bar and including a third body and a third coupling portion being extended from the third body, wherein the first coupling portion is not overlapped with the second body and the third body in an axial direction, wherein the second coupling portion is not overlapped with the third body in an axial direction, wherein the first body, the second body, and the third body are arranged to overlap in a radial direction, and wherein a first groove in which the first coupling portion is disposed is formed on an inner surface of the second bus bar.

11. A motor comprising:

a base;

a first bus bar being coupled to the base and including a first body and a first coupling portion being extended from the first body;

a second bus bar being disposed outside the first bus bar and including a second body and a second coupling portion being extended from the second body; and a third bus bar being disposed outside the second bus bar and including a third body and a third coupling portion being extended from the third body, wherein the first coupling portion is not overlapped with the second body and the third body in an axial direction, wherein the second coupling portion is not overlapped with the third body in an axial direction, wherein the first body, the second body, and the third body are arranged to overlap in a radial direction, wherein a first protrusion is disposed on an inner surface of the third bus bar, and wherein a second groove in which the first protrusion is disposed is formed on an outer surface of the second bus bar.

12. A motor comprising:

a base; and a first to third bus bars including a body coupled to the base and a coupling portion extending from the body, wherein the second bus bar is disposed between the first bus bar and the third bus bar, wherein the coupling portion of the second bus bar does not overlap with the body of the third bus bar in an axial direction, wherein at least a portion of the coupling portions of the first to third bus bars overlap each other in a circumferential direction, wherein the first bus bar includes a first body coupled to the base and a first coupling portion extending from the first body, wherein the second bus bar includes a second body disposed outside the first body and a second coupling portion extending from the second body, wherein the third bus bar includes a third body disposed outside the second body and a third coupling portion extending from the third body, and wherein a first groove in which the first coupling portion is disposed is formed on an inner surface of the second bus bar.

13. The motor according to claim 12, wherein an upper surfaces of the first body, the second body, and the third body are disposed on the same plane.

14. A motor comprising:

a base; and a first to third bus bars including a body coupled to the base and a coupling portion extending from the body, wherein the second bus bar is disposed between the first bus bar and the third bus bar, wherein the coupling portion of the second bus bar does not overlap with the body of the third bus bar in an axial direction, and wherein at least a portion of the coupling portions of the first to third bus bars overlap each other in a circumferential direction, wherein a first protrusion is disposed on an inner surface of the third bus bar, and wherein a second groove in which the first protrusion is disposed is formed on an outer surface of the second bus bar.

\* \* \* \* \*